US008878865B2

(12) United States Patent
Altman et al.

(10) Patent No.: US 8,878,865 B2
(45) Date of Patent: Nov. 4, 2014

(54) THREE-DIMENSIONAL MAP SYSTEM

(71) Applicant: Hover, Inc., Los Altos, CA (US)

(72) Inventors: Adam J. Altman, Los Altos, CA (US);
Matthew Boyer, Los Altos, CA (US);
Vineet Bhatawadekar, Los Altos, CA (US)

(73) Assignee: Hover, Inc., San Francisco, CA (US)

( * ) Notice: Subject to any disclaimer, the term of this patent is extended or adjusted under 35 U.S.C. 154(b) by 217 days.

(21) Appl. No.: 13/624,816

(22) Filed: Sep. 21, 2012

(65) Prior Publication Data
US 2013/0069944 A1 Mar. 21, 2013

Related U.S. Application Data

(60) Provisional application No. 61/537,485, filed on Sep. 21, 2011.

(51) Int. Cl.
| G06T 17/00 | (2006.01) |
| G09G 5/00 | (2006.01) |
| G06K 9/40 | (2006.01) |
| G06K 9/36 | (2006.01) |
| G06K 9/32 | (2006.01) |
| G06K 9/54 | (2006.01) |
| G06T 17/05 | (2011.01) |
| G06T 19/20 | (2011.01) |
| G09B 29/10 | (2006.01) |

(52) U.S. Cl.
CPC .............. *G06T 17/05* (2013.01); *G06T 19/20* (2013.01); *G09B 29/106* (2013.01); *G06T 2219/2024* (2013.01)
USPC ........... 345/583; 345/420; 345/581; 345/630; 345/660; 382/254; 382/285; 382/298; 382/305

(58) Field of Classification Search
USPC ......... 345/418–420, 581–582, 589, 619, 624, 345/629–630, 660; 382/108, 154, 254, 382/274–275, 228, 285, 298–299, 305, 382/307; 715/408–409
See application file for complete search history.

(56) References Cited

U.S. PATENT DOCUMENTS

| 8,339,394 | B1 * | 12/2012 | Lininger | 345/419 |
| 8,422,825 | B1 * | 4/2013 | Neophytou et al. | 382/294 |
| 8,749,580 | B1 * | 6/2014 | Lininger | 345/629 |
| 2009/0141966 | A1 * | 6/2009 | Chen et al. | 382/154 |
| 2010/0045869 | A1 | 2/2010 | Baseley et al. | |
| 2010/0074532 | A1 | 3/2010 | Gordon et al. | |
| 2011/0029897 | A1 | 2/2011 | Russell | |
| 2013/0073377 | A1 * | 3/2013 | Heath | 705/14.39 |

FOREIGN PATENT DOCUMENTS

WO 2011091552 A1 8/2011

OTHER PUBLICATIONS

Korean Intellectual Property Office; International Search Report and Written Opinion; International Application No. PCT/US12/56705; Feb. 8, 2013; 8 pgs.

* cited by examiner

*Primary Examiner* — Wesner Sajous
(74) *Attorney, Agent, or Firm* — Garlick & Markison; Randy W. Lacasse

(57) ABSTRACT

A method of operating a three-dimensional (3D) map system including: receiving an image and a geo-location tag of the image; determining a building model for a physical building corresponding to an object captured in the image based on the geo-location tag; mapping, on a region-by-region basis, the image to a stored facade of the building model; and mapping, on a pixel-by-pixel basis, the image to the stored facade of the building model for displaying the image as a new facade of the building.

25 Claims, 11 Drawing Sheets

THREE-DIMENSIONAL MAP SYSTEM

CROSS REFERENCE

This application claims the benefit of U.S. Provisional Patent Application Ser. No. 61/537,485 filed on Sep. 21, 2011, and the subject matter thereof is incorporated herein by reference thereto.

FIELD OF INVENTION

This invention relates generally to an interactive three-dimensional map system, and in particular to a system and method for generating, updating, and interacting with an interactive three-dimensional map system with location-based information.

BACKGROUND

Location-based technologies and mobile technologies are often considered the center of the technology revolution of this century. Essential to these technologies is a way to best present location-based information to devices, particularly mobile devices. The technology used to represent these information so far has been based on a two dimensional map.

Some efforts have been made to generate a three-dimensional map of urban cities via aerial imagery or specialized camera-equipped vehicles. However, these three-dimensional maps have limited texture and are difficult to update. No viable solutions have been found prior to this invention. Thus, there remains a need to solve the limitation in the existing two-dimensional (2D) and three-dimensional (3D) maps. Ways of resolving these problems have been sought by those in the art, but prior developments have not taught or suggested any viable solutions.

DISCLOSURE OF INVENTION

The present invention provides a three-dimensional (3D) map. The 3D map can include a 3D building model with textures and facade mapped on surfaces of the 3D building model. The 3D building model is representative of a physical building in the real-world. A map generation system is described. The map generation system can select a 3D building model corresponding to a physical building in the real-world based on an uploaded image. The uploaded image can be a photograph of the physical building. The uploaded image can include a facade of the physical building. The uploaded image can be mapped as a facade of the building model.

In one embodiment, the method of mapping an uploaded image to a building model can include: receiving an image and a geo-location tag of the image; determining a building model for a physical building corresponding to an object in the image based on the geo-location tag; mapping, on a region-by-region basis, the image to a stored facade of the building model; and mapping, on a pixel-by-pixel basis, the image to the stored facade of the building model for displaying the image as a new facade of the building. In another embodiment, the method can further include processing the image to remove an obstruction object.

Performing the region-by-region mapping before the pixel-by-pixel mapping has the advantage of highlighting regional changes without affecting the mapping process. For example, if the owner of a building has done some remodeling to the physical building, any new photographs of the new building can still be mapped to the building model, with the remodeled region highlighted as a changed region.

Once a building model has been selected to correspond to the uploaded image, the uploaded image is warped to the 3D model of the building. Points in the uploaded image can be matched accurately to points in the database. Full 3D mapping of the uploaded image as a facade of the building in the physical world can be accomplished. The 3D building model in the 3D map can thus be re-textured and its 3D geometry refined based on the uploaded image.

Images uploaded to the system can be processed either fully automatically or semi-automatically. The images uploaded can be curated by users themselves or at a trained analyst terminal regularly. The semi-automated approach can fix geometry errors and inconsistencies. 3D data not directly extracted by automated algorithms can be passed on to trained humans for processing. The removal of objectionable content can also be processed automatically or semi-automatically in the same way as fixing geometry errors and inconsistencies.

A three-dimensional map provides advantages over a two-dimensional map. For example, a three-dimensional map can include accurate representations of buildings in a city. These representations can be used to deliver information to users who view the map. These representations can include a display of the building facade to a viewer of the three-dimensional map. The facade can be appended to the three-dimensional model using similar techniques to those used in creating the building representation. A user can upload a facade image to the 3D map system. The 3D map system can select the building and the side of the building with which the image corresponds. The 3D map system can then mark out the corners of the facade in the image to be included, thus creating correlation points to match with points in the model. The 3D map system can then submit the image to a render module of the 3D map system. The geo-coding engine of the 3D map system can then assimilate the new image into the model and display the uploaded image as the facade of the building.

Optionally, the building model selection can be done semi-automatically, such as having the user make some or all of the selection. Also optionally, some or all of the corner matching process can be done semi-automatically. Additionally, if the image uploaded by the user includes geo-location data, the system can determine generally what building the image corresponds to and make recommendations to user based on the location data, thereby making the upload process semi-automatic. With semi-accurate geo-location information associated with the street level image of the facade in question, the engine can determine through a combination of logic modules and computer vision algorithms the three dimensional building model in question, then automatically fuse the new facade into the three dimensional building model, creating a fully automated process—from crowd-sourced image to updated three dimensional model facade.

This process of allowing users to upload facade images can provide a near real-time photographic representation of a city. This can be an advantage to a user who is looking at a restaurant for example, and the latest image of the building facade was recently updated. If the user sees a line formed outside of the restaurant in the recently uploaded image, the user can take that into consideration when making a decision whether to visit the restaurant or not.

Some embodiments of the invention have other aspects, elements, features, and steps in addition to or in place of what is described above. These potential additions and replacements are described throughout the rest of the specification

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Disclosed are methods and systems of generating an interactive three-dimensional map, and more particularly, a system and method for creating, interacting with and updating the three-dimensional model to include near real-time location relevant information. The techniques introduced here can be applied to any one of a number of types of three-dimensional maps that provide accurate geo-location. In one embodiment, the three dimensional maps are created from data extracted from one two-dimensional orthogonal image, two or more two-dimensional oblique images, and a digital elevation model, as described in U.S. patent application Ser. No. 12/265,656, which is incorporated herein by reference in its entirety. In another embodiment, the three dimensional maps are generated by the techniques described in FIGS. 2-6.

The facade of a building in the three-dimensional map can be utilized to disseminate information relating to the building or a point-of-interest located in the building. This information can include, for example, advertisements relating to points of interest associated with the building, aggregation of social media, pictures, and/or news related to the building or points of interest associated with the building, and near real-time facades of the building. Additionally, a user's interaction with a point-of-interest, for example, the time that a user spends looking at a building on the three-dimensional map, can be provided to a business owner that is located in the building and the business owner can make business plans based on the users' interactions.

Figure 1:
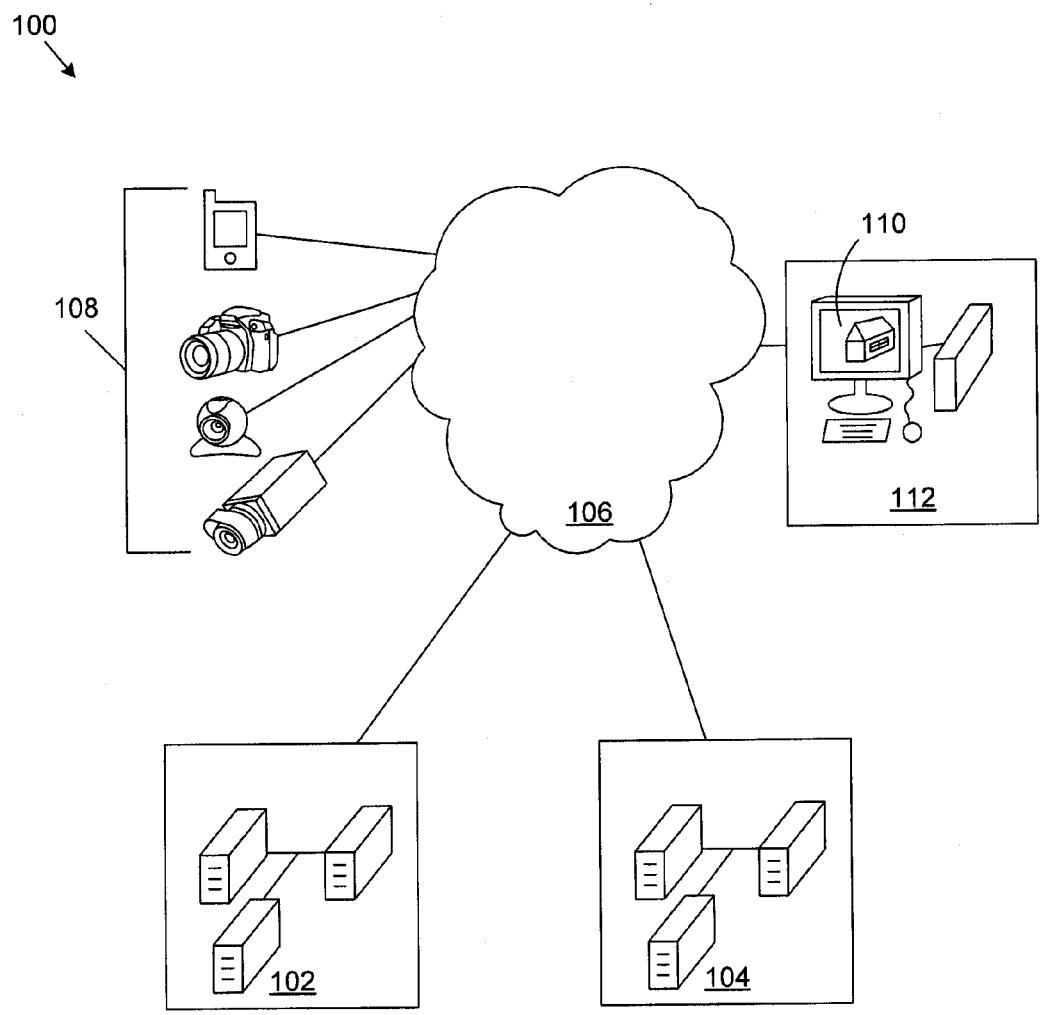
FIG. 1 is a system architecture of a three-dimensional map system.

Referring now to FIG. 1, therein is shown a system architecture of a three-dimensional map system 100. The three-dimensional map system 100 can include an image process system 102 and a map generation system 104. The map generation system 104 and the image process system 102 can be coupled via a network channel 106. The image process system 102 is a computer system for processing images in preparation for mapping the images to a 3D environment. The image process system 102 can be the computer system of FIG. 10. The map generation system 104 is a computer system for providing a three-dimensional (3D) environment. The map generation system 104 can be the computer system of FIG. 10.

The network channel 106 is a system for communication. The network channel 106 can encompass a variety of mediums of communication, such as via wired communication for one part and via wireless communication for another part. The network channel 106 can be part of the Internet.

For example, the network channel 106 can include an Ethernet or other wire-based network or a wireless NIC (WNIC) or wireless adapter for communicating with a wireless network, such as a WI-FI network. The network channel 106 can include any suitable network for any suitable communication interface. As an example and not by way of limitation, the network channel 106 can include an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, the network channel 106 can be a wireless PAN (WPAN) (such as, for example, a BLUETOOTH WPAN), a WI-FI network, a WI-MAX network, a 3G or 4G network, a cellular telephone network (such as; for example, a Global System for Mobile Communications (GSM) network).

In one embodiment, the network channel 106 can use standard communications technologies and/or protocols. Thus, the network channel 106 can include links using technologies such as Ethernet, 802.11, worldwide interoperability for microwave access (WiMAX), 3G, 4G, CDMA, digital subscriber line (DSL), etc. Similarly, the networking protocols used on the network channel 106 can include multiprotocol label switching (MPLS), the transmission control protocol/Internet protocol (TCPIP), the User Datagram Protocol (UDP), the hypertext transport protocol (HTTP), the simple mail transfer protocol (SMTP), and the file transfer protocol (FTP). The data exchanged over the network channel 106 can be represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

The image process system 102 can collect images uploaded from capture devices 108. The capture devices 108 are defined as electronic devices for capturing images. For example, the capture devices 108 can include a camera, a phone, a smart phone, a tablet, a video camera, a security camera, a closed-circuit television camera, a computer, a laptop, a webcam, a pair of electronic glasses, photosensitive sensors, or any combination thereof. The capture devices 108 can directly upload to the image process system 102 via the network channel 106, or can indirectly upload the images. For example, the images can be uploaded to a computer or a server first before being uploaded to the image process system 102. For another example, the images can be transferred from a camera first to a networked computer, and then the images are transferred to the image process system 102.

The image process system 102 can process the images collected. A photograph image of the images collected can be mapped to a specific building. The photograph image can also be mapped on a particular surface or region of the building.

The mapping is updated to a facade database in the map generation system 104. The map generation system 104, according to the mapping stored on the facade database, can render a 3D environment 110 for display on a viewer device 112. The 3D environment 110 is defined as a 3D map including virtual representation of physical world buildings. The 3D environment 110 can also include 3D models of landscape and terrain.

The viewer device 112 is defined as a display device. For example, the viewer device 112 can be a computer with a monitor, a laptop, a touch screen display, a LED array, a television set, a projector display, or any combination thereof. The viewer device 112 can include to a computer system, such as a computer system 1400 of FIG. 10, for processing the 3D environment 110 for display.

Figure 2:
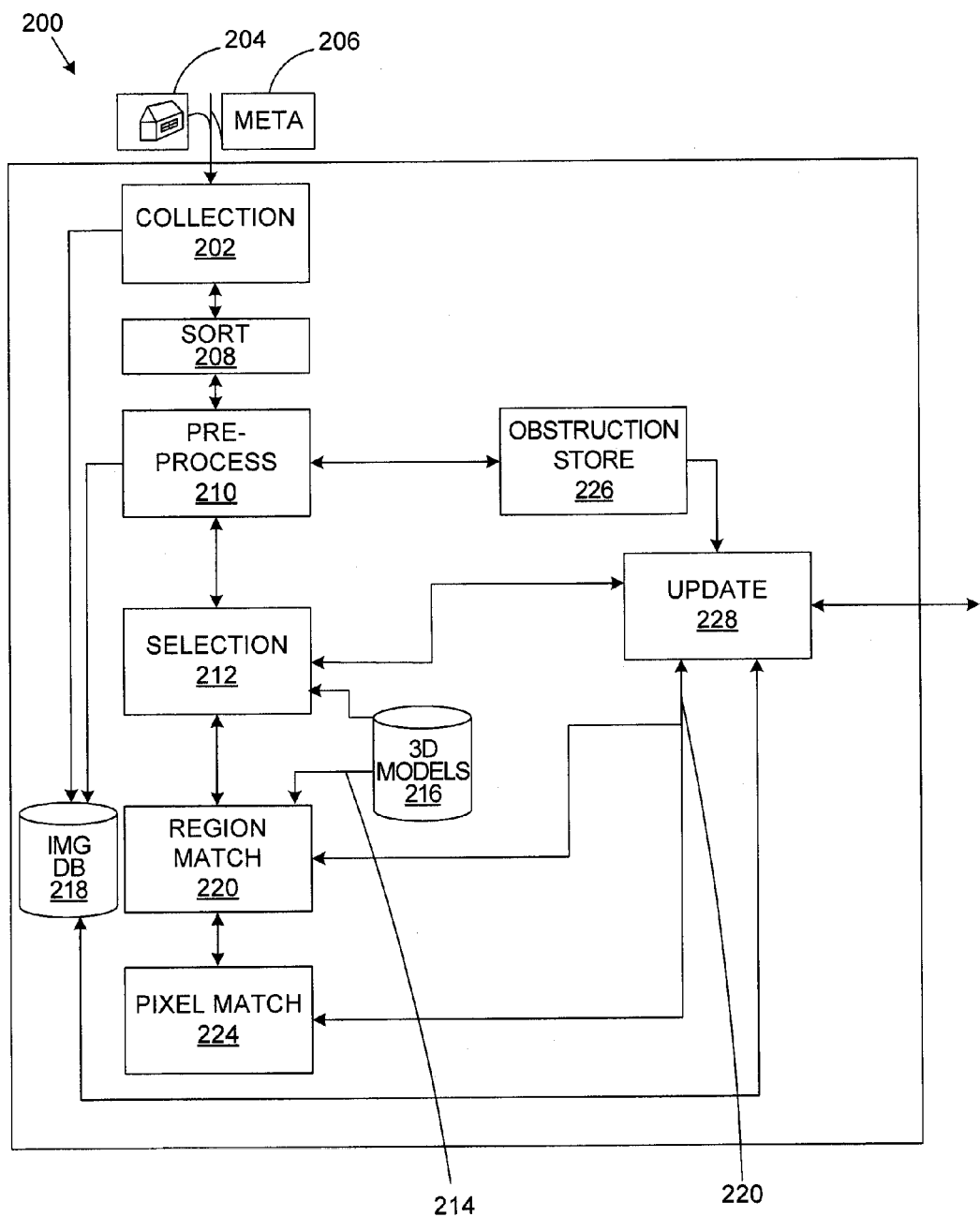
FIG. 2 is a control flow of an image mapper system.

Referring now to FIG. 2, therein is shown a control flow of an image mapper system 200. The image mapper system 200 can be part of the three-dimensional map system 100 of FIG. 1. The image mapper system 200 is for mapping a consumer uploaded image to a particular surface of a building model associated with a physical building. The image mapper system 200 is a computer system with at least one processor and one non-transitory memory. The image mapper system 200 can be the image process system 102 of FIG. 1. The image mapper system 200 can also be on the same computer system as the map generation system 104 of FIG. 1. The image mapper system 200 can be a computer system of FIG. 10.

The image mapper system 200 can include one or more methods of mapping a consumer uploaded image. The one or more methods can be implemented by components, storages, and modules described below. The modules can be implemented as hardware modules/components, software modules, or any combination thereof. For example, the modules described can be software modules implemented as instructions on a non-transitory memory capable of being executed by a processor or a controller on a machine described in FIG. 10.

Each of the modules can operate individually and independently of other modules. Some or all of the modules can be combined as one module. A single module can also be divided into sub-modules, each performing separate method step or method steps of the single module. The modules can share access to a memory space. One module can access data accessed by or transformed by another module. The modules can be considered "coupled" to one another if they share a physical connection or a virtual connection, directly or indirectly, allowing data accessed or modified from one module to be accessed in another module.

The storages or "stores", described below are hardware components or portions of hardware components for storing digital data. Each of the storage can be a single physical entity or distributed through multiple physical devices. Each of the storage can be on separate physical device or share the same physical device or devices. Each of the stores can allocate specific storage spaces for run-time applications.

The image mapper system 200 can include additional, fewer, or different modules for various applications. Conventional components such as network interfaces, security functions, load balancers, failover servers, management and network operations consoles, and the like are not shown so as to not obscure the details of the system.

The image mapper system 200 can include a collection module 202. The collection module 202 is for collecting photographs, such as photographs of physical buildings, from consumer devices. For example, the collection module 202 can collect a photograph image 204 of a physical building from a user device, such as the capture devices 108 of FIG. 1.

The collection module 202 can download not only the photograph image 204, but a metadata entry 206 related to the photograph image 204. For example, the collection module 202 can capture a creation date of the photograph, an upload date of the photograph, compass information, other directional information, relational position information, a geographical location tag of where the photograph image 204 is taken, an identifier of the photographer, or any combination thereof.

The image mapper system 200 can include a sort module 208. The sort module 208 is for sorting the photographs collected by the collection module 202. For example, the sort module 208 can sort the collected photographs by date of creation. An administrator of the image mapper system 200 can set a threshold time duration beyond which the photograph image 204 expires. When the photograph image 204 has a creation date prior to a threshold duration, the photograph image 204 can be sorted out of the system.

For another example, the sort module 208 can sort the collected photographs by geo-location. The sort module 208 can organized the photograph image 204 based on the geographical location to activate a pre-process module 210 and a selection module 212 for that specific geographical location.

The image mapper system 200 can include the pre-process module 210. The pre-process module 210 is for processing photographs by removing certain features of the photographs. For example, the pre-process module 210 can include removal of obstructions from the photograph image 204. The photograph image 204 can include a facade of a physical building. The obstructions are defined as features of the photograph image 204 that are not part of the facade. The obstructions, for example, can include mobile objects, such as vehicles, pedestrians, posters, or any combination thereof. The obstruction, for example, can also include background features, such as landscape, skyscape, rain, fog, smoke, foliage, civil infrastructures, or any combination thereof. The removal process can be done semi-automatically. For example, the photograph image 204 can be shown to a viewer or a trained professional with segmentations overlaid on a display. The viewer or trained professional can then select the segmentations that are considered as obstructions for removal.

The pre-process module 210 can utilize machine learning models to segment out parts of the photograph image 204 that represent the obstructions. The pre-process module 210 can be based on a geometric classifier based on features of the photograph image 204. For example, the photograph image 204 can be processed by the classifier to identify two pedestrians, one car, and two trees. After the obstruction is classified by the geometric classifier, the pre-process module 210 can further determine whether an obstruction of the type exists by, for example, a support vector machine for the particular type of the obstruction. Other machine learned models can be used for detecting the obstruction, such as heuristics, mixture models, Markov models, or any combination thereof. These models used can also calculate the likelihood that an obstruction of the type exists. The likelihood can then be thresholded to make a decision of whether the obstruction should be removed. The boundaries of the obstruction can be determined by the machine learned models or any type of segmentation modules.

The image mapper system 200 can include the selection module 212. The selection module 212 is for selecting a building model 214 corresponding to a facade captured by the photograph image 204. The building model 214 can be selected from a models database store 216. The models database store 216 is a store of building models corresponding to physical buildings.

The selection process can include multiple layers. For example, a first selection layer can include determining a set of buildings within a geographical location and/or camera orientation/direction of the photograph image 204. The geographical location of the photograph image 204 can be determined from the metadata entry 206 of the photograph image 204, where the metadata entry 206 may have been captured by sensors of the capture devices.

The selection module 212 can also include a second selection layer. In the second selection layer, the selection module 212 can narrow down the set by comparing the photograph image 204 against contents of an image database store 218 corresponding to each building in the set. The stored facades in the image database store 218 can each correspond to a building model in the models database store 216.

For both selection layers, a certainty probability of whether the correct building model is selected is calculated by the selection module 212. In one embodiment, if the certainty probability is below a threshold, the selection module 212 can send the photograph image 204 to a user interface for semi-automatic selection. An array of neighboring building models and corresponding facades can be shown at the user interface. The photograph image 204 can also be displayed on the user interface. Through the user interaction, a user can select the correct neighboring building model that matches what is captured by the photograph image 204.

The image database store 218 is a data store of the image mapper system 200. The image database store 218 includes images previously processed and mapped, where the images were previously determined to correspond to particular building models of physical buildings. Hence, for each building model, the image database store 218 can include previously authenticated or validated facade images. Once validated, the photograph image 204 can be stored in the image database store 218 as well, including the processed version of the photograph image 204 after the processing of the pre-process module 210.

The comparison between the photograph image 204 and an image corresponding to a building model can include color distribution matching or texture matching. Each building model in the set is ranked in the comparison. A subset of the set is selected by the selection module 212 for further analysis. In one embodiment, the building model 214 can be determined at the second selection layer of the selection module 212. In some embodiments, the second selection layer can occur after the pre-process module 210 has removed the obstructions in the photograph image 204. In other embodiments, the second selection layer can occur before the pre-process module 210 has removed the obstructions.

The image mapper system 200 can include a region match module 220. The region match module 220 is for mapping regions of the photograph image 204 to regions of a facade image in the image database store 218. The facade image is an image in the image database store 218 corresponding to the building model 214. The selection of the building model 214 can occur in the selection module 212.

Each region in the facade image can be defined based on heuristics of what a regular feature on a facade looks like. For example, the heuristics can include classes such as sign board, lighting, window, door, roof, other structural modular objects, or any combination thereof. Each region can also be defined based on image segmentation algorithms.

Each region in the facade image is matched against each region in the photograph image 204. The matching can occur such that even if the camera conditions (angle, distance, focus, etc.) of the photograph image 204 is different from the stored facade image, the photograph image 204 can be stretched in such a way that regions of the photograph image 204 can still be mapped. Matched regions are annotated as being mapped to each other. The mapping, such as an image map 222, can be saved and reflected in the models database store 216 and/or the image database store 218.

The image mapper system 200 can include a pixel match module 224. The pixel match module 224 is for mapping pixels of the photograph image 204 to pixels of the facade image in the image database store 218. Each pixel in the facade image is matched against pixels of the photograph image 204. In one embodiment, the mapping can be a one-to-one mapping. In other embodiments, the mapping can be one-to-many or many-to-one. The pixels can be mapped to one another in a manner that pixels in one region of the facade image is mapped to pixels in the corresponding region of the photograph image 204 based on the stored mapping of the regions.

Both the region match module 220 and the pixel match module 224 can calculate the certainty probability that each mapping is correct. In one embodiment, if the certainty probability is below a threshold, the region match module 220 and the pixel match module 224 can send the photograph image 204 to a user interface for semiautomatic selection. An array of neighboring regions or pixels and corresponding facades can be shown at the user interface. The photograph image 204 can also be displayed on the user interface. Through the user interaction, a user can indicate the right mapping between neighboring regions and pixels.

The image mapper system 200 can include an obstruction object store 226. The obstruction object store 226 can be a store that contains the images and classification of obstructions removed by the pre-process module 210 for the photograph image 204. The contents of the obstruction object store 226 can be used to perform data analysis for displaying on the 3D map system. For example, if the same car is repeatedly determine to be parked at a particular spot, the 3D map system can tag that car as being a frequent visitor of that location. For another example, if a lot of pedestrian traffic is detected at a lounge bar location and captured by the obstruction object store 226, the increased in traffic can be used to alert the bar owner about when their store is most popular.

The image mapper system 200 can include an update module 228. The update module 228 is for updating a map generation system the mappings made for the photograph image 204 to the building model 214. For example, the image map 222 can be send to the map generation system for displaying the mapped photograph on a rendered building model. The update module 228 can also send the contents of the obstruction object store 226 to the map generation system for displaying or for generating alert indicators.

The techniques introduced in the modules below can be implemented by programmable circuitry programmed or configured by software and/or firmware, or they can be implemented by entirely by special-purpose "hardwired" circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the techniques introduced here may be stored on a machine-readable storage medium and may be executed by one or more general-purpose or special-purpose programmable microprocessors. A "machine-readable medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "module," as used herein, can include, for example, special-purpose hardwired circuitry, software and/or firmware in conjunction with programmable circuitry, or a combination thereof.

The modules or stores described in the image mapper system 200 can be stored on or executed on the image process system 102 of FIG. 1, however, it is understood that some or all of the modules can also be stored on or run on the map generation system 104 of FIG. 1. For example, the models database store 216 can be a store in the image process system 102 or the map generation system 104.

Figure 3:
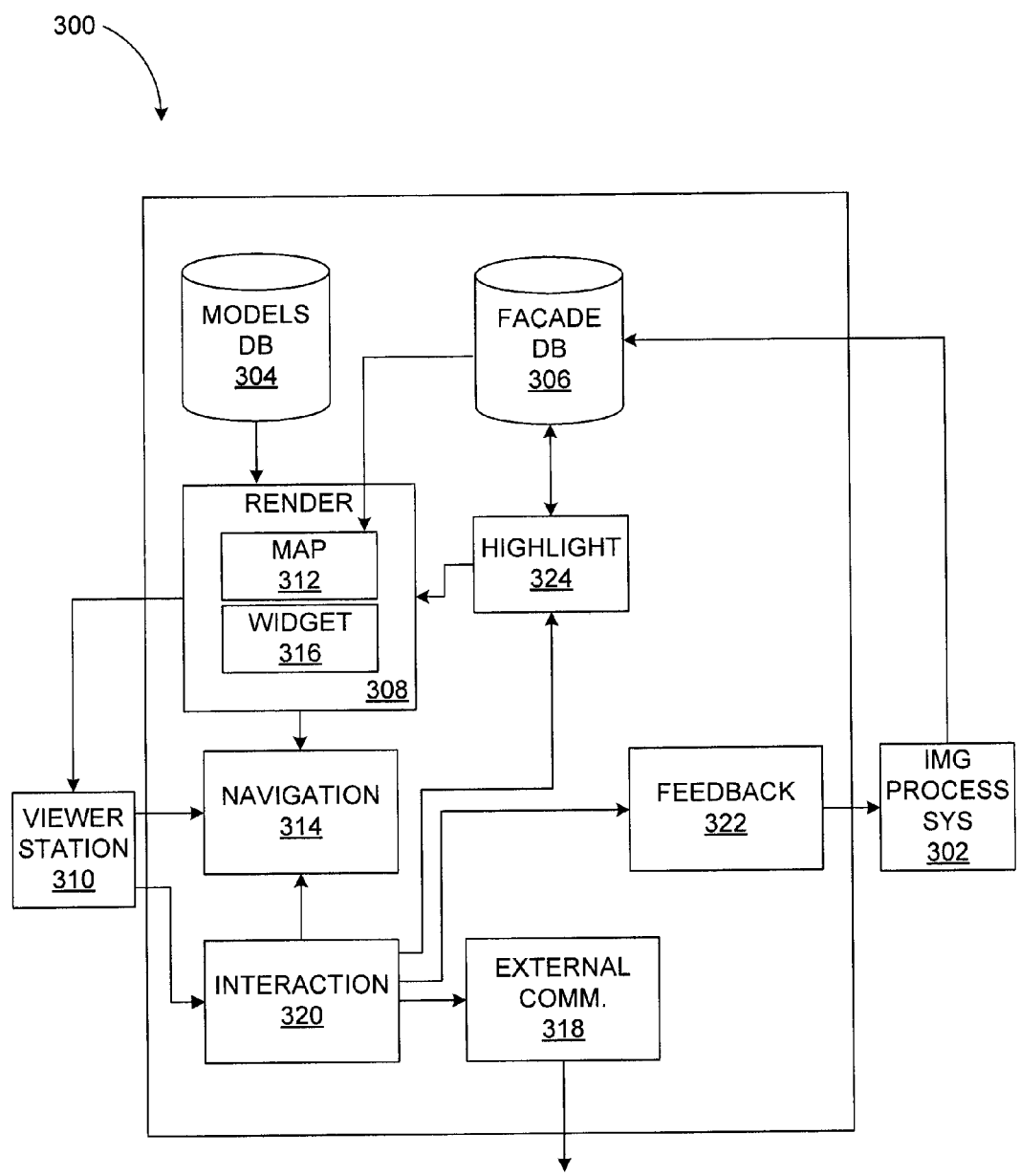
FIG. 3 is a control flow of a map generation system.

Referring now to FIG. 3, therein is shown a control flow of a map generation system 300. The map generation system 300 can be part of the three-dimensional map system 100 of FIG. 1. The map generation system 300 is for generating a three-dimensional map from at least geo-coded facade corresponding to a three-dimensional building model. The map generation system 300 is a computer system with at least one processor and one non-transitory memory. The map generation system 300 can be the map generation system 104 of FIG. 1. The map generation system 300 can also be on the same computer system as the image process system 102 of FIG. 1. The map generation system 300 can be a computer system of FIG. 10.

The map generation system 300 can include one or more methods of generating a three-dimensional map. The one or more methods can be implemented by components, storages, and modules described below. The modules can be implemented as hardware components, software modules, or any combination thereof. For example, the modules described can be software modules implemented as instructions on a non-transitory memory capable of being executed by a processor or a controller on a machine described in FIG. 10.

Each of the modules can operate individually and independently of other modules. Some or all of the modules can be combined as one module. A single module can also be divided into sub-modules, each performing separate method step or method steps of the single module. The modules can share access to a memory space. One module can access data accessed by or transformed by another module. The modules can be considered "coupled" to one another if they share a physical connection or a virtual connection, directly or indirectly, allowing data accessed or modified from one module to be accessed in another module.

The storages or "stores", described below are hardware components or portions of hardware components for storing digital data. Each of the storage can be a single physical entity or distributed through multiple physical devices. Each of the storage can be on separate physical device or share the same physical device or devices. Each of the stores can allocate specific storage spaces for run-time applications.

The map generation system 300 can include additional, fewer, or different modules for various applications. Conventional components such as network interfaces, security functions, load balancers, failover servers, management and network operations consoles, and the like are not shown so as to not obscure the details of the system.

The map generation system 300 can be coupled to an image process system 302. The image process system 302 is a computer system for processing images, such as the image process system 102 of FIG. 1 or the image mapper system 200 of FIG. 2.

The map generation system 300 can include a models database store 304. The models database store 304 is a store on the map generation system 300 for storing building models for use in the overall 3D map system. The models database store 304 can be the models database store 216 of FIG. 2. The models database store 304 can also be a replicated, synched, or mirrored copy of the models database store 216.

The map generation system 300 can include a facade database store 306. The facade database store 306 is a store on the map generation system 300 for storing facades for building models for use in the overall 3D map system. Each building model can have one or more facades. Each surface of each building can also have one or more facades. The facades can be received from the image process system 302. For example, the photograph image 204 of FIG. 2, once mapped to a building model, can be stored as a facade for the building model on the facade database store 306.

In one embodiment, the facade database store 306 can be the image database store 218 of FIG. 2. In another embodiment, the facade database store 306 can be synched and mirrored with the image database store 218 of FIG. 2.

The map generation system 300 can include a render module 308. The render module 308 is for generating a 3D map environment. For example, the render module 308 can generate the 3D map by rendering building models for displaying on a viewer station 310.

The render module 308 can include a mapper module 312. The mapper module 312 is for mapping facades in the facade database store 306 onto surfaces of building models in the models database store 304. For example, the facade database store 306 contains the photograph image of a facade of a physical building. Mapping of the photograph image to a building model corresponding to the physical building can be used to texture the building model with the photograph image. The mapper module 312 can texture the rendered building models. These mappings can be provided by the image process system 302.

The map generation system 300 can include a navigation module 314. The navigation module 314 is for traversing through the 3D map environment generated by the render module 308. For example, a user operating the viewer station 310 can use arrow keys or mouse to move about the 3D map environment that is rendered in real-time. The viewer station 310 can display representations of physical buildings in different perspective as the user navigates from different perspective position and direction in the 3D map. The navigation module 314 facilitates that navigation and coordinates the re-rendering of the building models and the facades.

The render module 308 can include a widget module 316. The widget module 316 is for providing a widget along side or on a facade. For example, the widget module 316 can communicate with a social network via an external communication module 318. The widget module 316 can display a feed of a page on the social network on a facade of a building model, wherein the page is for the tenant of the physical building represented by the building model. For example, the social network can include Facebook™, Yelp™, FourSquare™, Trulia™, Zillow™, any other location-based service, or any combination thereof. The social feed of a tagged user account can be displayed on the facade, where the tagged user account has been tagged on a geo-location basis corresponding to the location of the rendered facade.

For another example, the widget module 316 can display an interactive portal for communication on a facade of a building model. The communication is for any combination of a tenant of the physical building represented by the building model, a user of the viewer station 310, or a third party.

For yet another example, the widget module 316 can display an advertisement object on a facade of a building model. The advertisement object can be text, a multimedia object, an image, an interactive multimedia object, or any combination thereof. The advertisement object can be targeted at the user of the viewer station 310. The advertisement object can be sponsored by a tenant of the physical building represented by the building model.

The widget module 316 can also provide a virtual ruler. The virtual ruler can be tied to the real-world, such that viewers of the 3D map system can use the virtual ruler to measure buildings and landscape in the physical world.

The map generation system 300 can include an interaction module 320. The interaction module 320 is for processing and recording interactions received from the viewer station 310. For example, the interaction module 320 can serve multiple functions. The interaction module 320 can serve to receive inputs from the viewer station 310 about the direction and position of the 3D map to traverse to. In this example, the interaction module 320 can be coupled to the navigation module 314 to re-render the 3D map for the viewer station 310.

The interaction module 320 can also receive inputs from the viewer station 310 to interaction with an external system, such as a social network system, a communication service, or a point-of-interest website. In one specific example, the interaction module 320 can receive voice or text inputs for a user of the viewer station 310 to communicate through a communication portal provided by the widget module 316.

The interaction module 320 can further receive feedback inputs for the image process system 302. The feedback inputs can be processed by a feedback module 322. The user of the viewer station 310 can comment on or interact with items displayed on facades rendered by the mapper module 312. The user can also comment on or interact with the building models themselves. These comments and interactions can be piped back to the image process system 302 for processing. For example, the user can select a region of a facade to indicate that there is texture mismatch. The image process system 302 can then take that feedback to correct the mapping of the facade. The user can also provide an explanation of the texture mismatch.

A user's interaction with a point-of-interest, for example, the time that a user spends looking at a building on the three-dimensional map, can be recorded by the interaction module 320. The interaction module 320 can then provide that information to a business owner that is located in the physical building represented by the building model. The interaction module 320 can collect hyper-accurate information relating to where the user (i.e., a person viewing the map) is focusing. For example, if the user is looking at the facade, for thirty seconds while reading the social network feeds, etc., this information can be tracked in a database and provided to the establishment owner for marketing purposes. If the user then moves on to a second point on the three-dimensional map, that position information can be recorded as well. This is an advance over two-dimensional maps because it is difficult to determine on which objects the viewer of a two-dimensional map is focusing.

The map generation system 300 can include a highlight module 324. The highlight module 324 is for detecting changes in facades of building models, including specific regions or as a whole. The highlight module 324 can also coordinate with the render module 308 to highlight the region of the facade that has changed. As new facades for a building model is uploaded from the image process system 302, the highlight module 324 can analyze the new mapped photos to highlight the regions in those photos that are different from the previous versions of stored facades. In some embodiment, the region match module 220 of FIG. 2 can provide the information about which regions of the facade has been changed.

The highlight module 324 can be used in a variety of applications. The detected change can be used for inspection. This includes inspection of whether a building has been knocked down, a wall has been repainted. The detected change can be used for detecting patterns of change. For example, the highlight module 324 can indicate that the door of this building appears to open everyday at 7 AM by recognizing a regional change of the facade image at the door of the building model. The detected change can further be used for user search and contextual information.

The highlight module 324 can be used to indicate locations needing repair. This can be used by a building owner or a city inspector. This can also be used for utility companies, insurance, and tax assessors who need to constantly inspect buildings in a city. Hence, the highlight module 324 can be coupled to external systems, such as an inspection system, an assessment system, an insurance calculation system, a repair detection system, or any combination thereof. The highlight module 324 can be used to make social statements. The facade images can be changed virtually, that is a virtual tag can be added on a facade through the viewer station 310. The virtual tag can be a social statement, such as "this is the place where I had my first kiss." This virtual tag can be selectively shown to some of the viewers of the 3D map system.

The techniques introduced in the modules below can be implemented by programmable circuitry programmed or configured by software and/or firmware, or they can be implemented by entirely by special-purpose "hardwired" circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the techniques introduced here may be stored on a machine-readable storage medium and may be executed by one or more general-purpose or special-purpose programmable microprocessors. A "machine-readable medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "module," as used herein, can include, for example, special-purpose hardwired circuitry, software and/or firmware in conjunction with programmable circuitry, or a combination thereof.

The modules or stores described in the map generation system 300 can be stored on or executed on the map generation system 104 of FIG. 1, however, it is understood that some or all of the modules can also be stored on or run on the image process system 102 of FIG. 1. For example, the models database store 304 can be a store in the image process system 102 or the map generation system 104.

Figure 4:
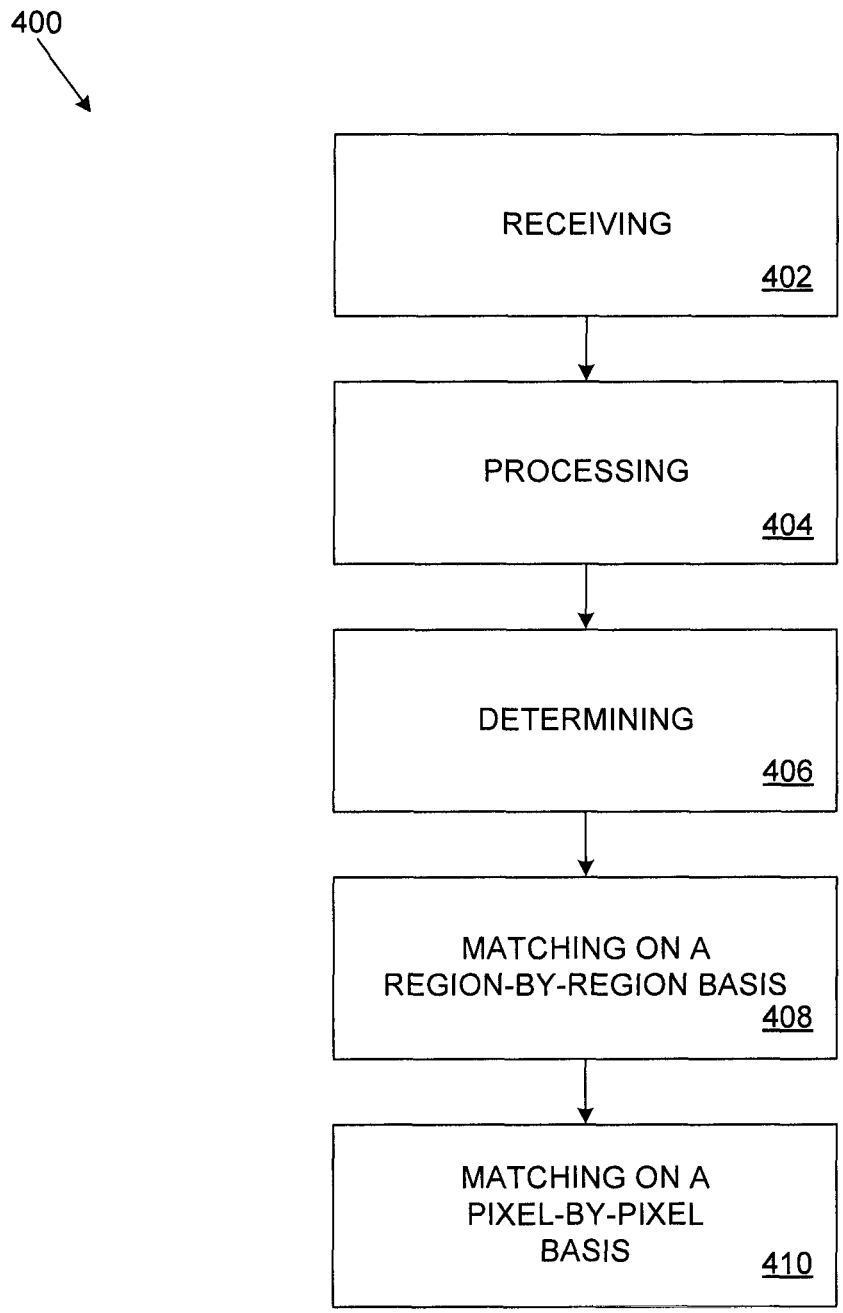
FIG. 4 is a flow chart of a method of generating a 3D map from collected images.

Referring now to FIG. 4, therein is shown a flow chart of a method 500 of generating a 3D map from collected images. The method 500 includes a method step 502 of receiving an image and a geo-location tag of the image; a method step 504 of processing the image to remove an obstruction object; a method step 506 of determining a building model for a physical building corresponding to an object in the image based on the geo-location tag; a method step 508 of mapping, on a region-by-region basis, the image to a stored facade of the building model; and a method step 510 of mapping, on a pixel-by-pixel basis, the image to the stored facade of the building model for displaying the image as a new facade of the building.

Figure 5:
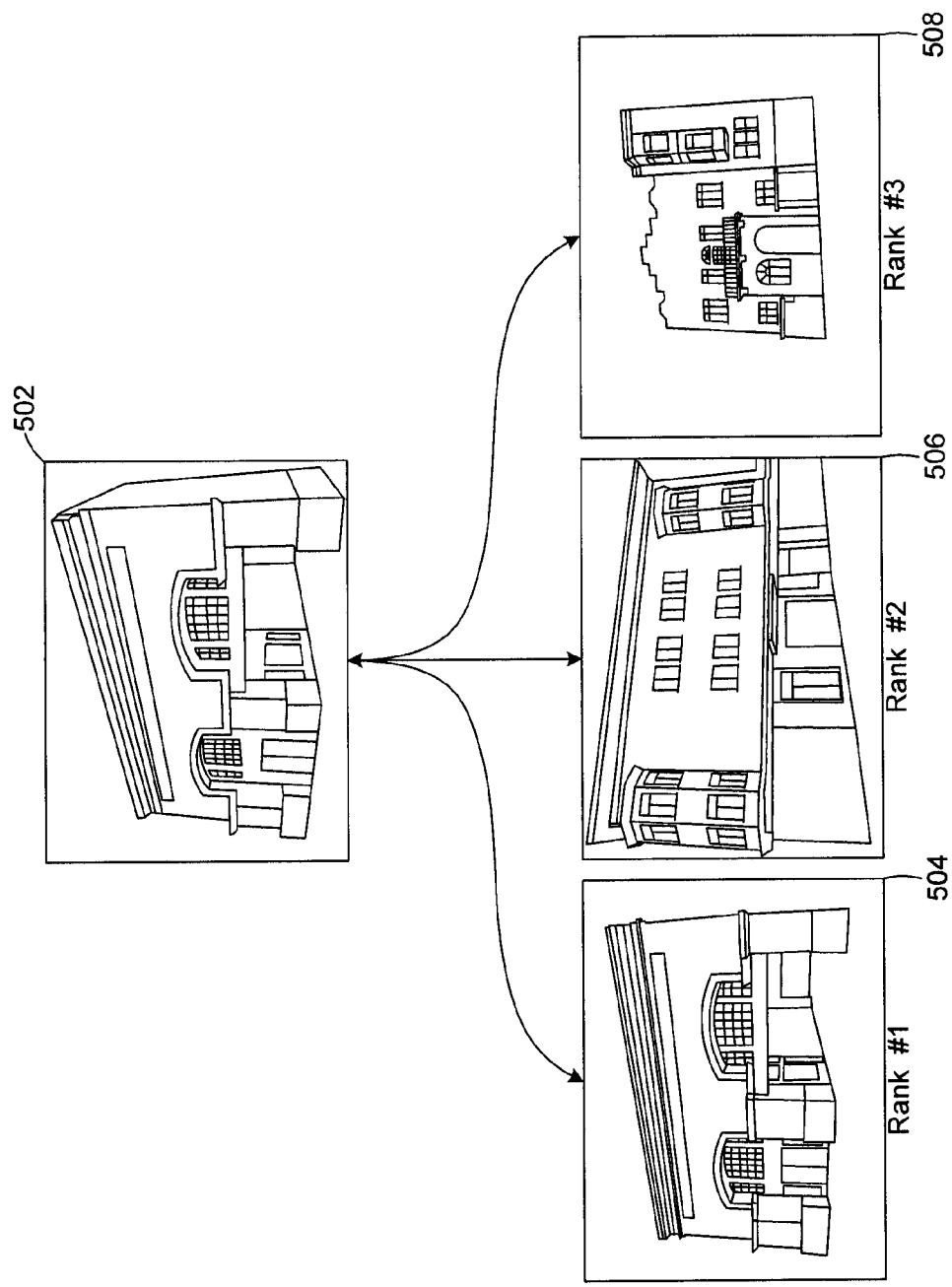
FIG. 5 is an illustration of an example of how the three-dimensional map system can map an image to a 3D building model.

Referring now to FIG. 5, therein is shown an illustration of an example of how the three-dimensional map system 100 can map an image to a 3D building model. The 3D building model is representative of a physical building in the real-world. Here, the system can select the physical building based on an uploaded image 502. The uploaded image 502 can include a facade of the building.

The system can separate the facade from the rest of the image 502 by pre-processing filters. The pre-processing filters can eliminate cars, pedestrians, trees, sky, any other non-building object, or any combination thereof. The system can then narrow down the search for the target physical building by analyzing the metadata associated with the image 502, including the geo-location data associated with the image 502. The system then performs a content based analysis to find the most similar facade in the database to the processed image. The facades of neighboring buildings in the database are ranked according to their similarity as illustrated by FIG. 5. For example, a first database facade 504 can be most similar to the processed image 502. The similarity can be based on texture, color, other means of classification based on image property, or any combination thereof. A second database facade 506 and a third database facade 508 can also be ranked against the first database facade 504. In this example, the second database facade 506 is ranked more similar to the image 502 than the third database facade 508.

Once a building model has been selected to correspond to the image 502, the image 502 is warped to the 3D model of the building. Points in the user image can be matched accurately to point in the database. Full 3D mapping of the image 502 as a facade of the building in the physical world can be accomplished in the above described manner. The 3D building model in the 3D map can thus be re-textured and its 3D geometry refined based on the uploaded image 502.

Figure 6A:
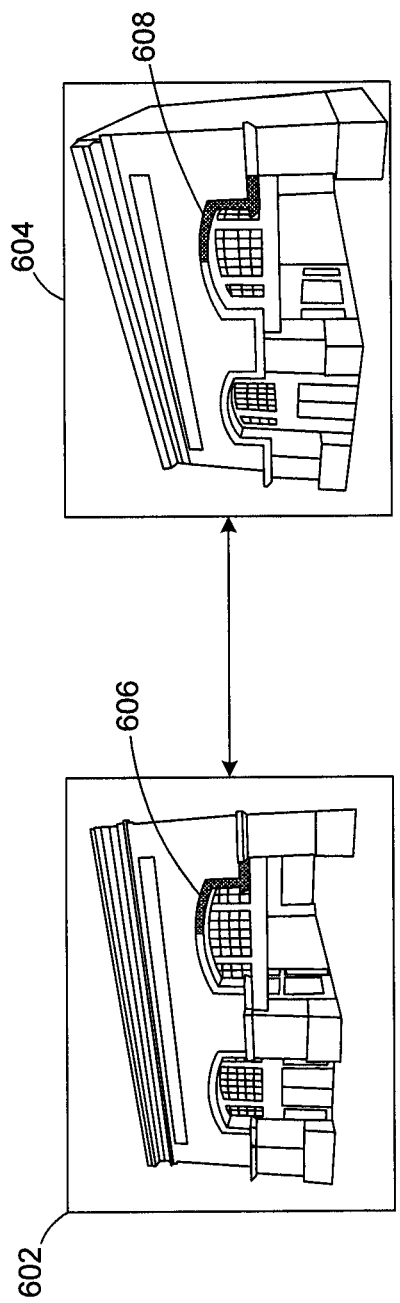
FIGS. 6A-6B are illustrations of an example of how the three-dimensional map system can perform a 3D interpretation of a scene within a consumer uploaded image.

Referring now to FIG. 6, therein is shown an illustration of an example of how the three-dimensional map system 100 can perform a 3D interpretation of a scene within a consumer uploaded image. Specifically, FIG. 6A illustrates an example of a region based matching, such as the method described for the region match module 220 of FIG. 2. FIG. 6A illustrates a mapping of regions between an uploaded photograph 602 and a stored facade 604. A first region 606 of the uploaded photograph 602 is shown to be a window cover. The first region 606 can then be matched to a second region 608 of the stored facade 608.

Figure 6B:
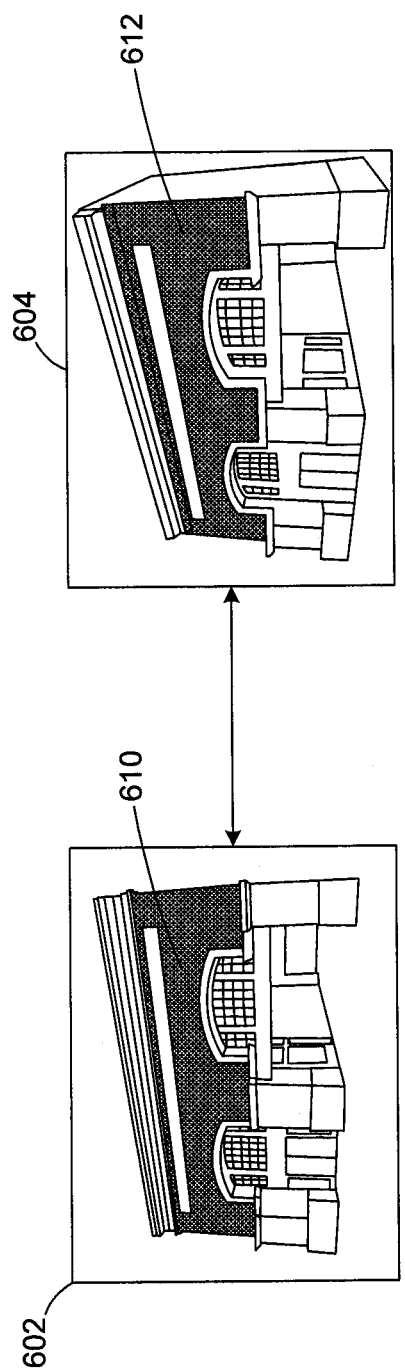

Similarly, FIG. 6B illustrates another example of a region based matching. FIG. 6B illustrates a third region 610 shown to be a flat top frontal portion of the physical building captured in the uploaded photograph 602. The third region 610 can then be matched and mapped to a fourth region 612 of the stored facade 608.

Figure 7:
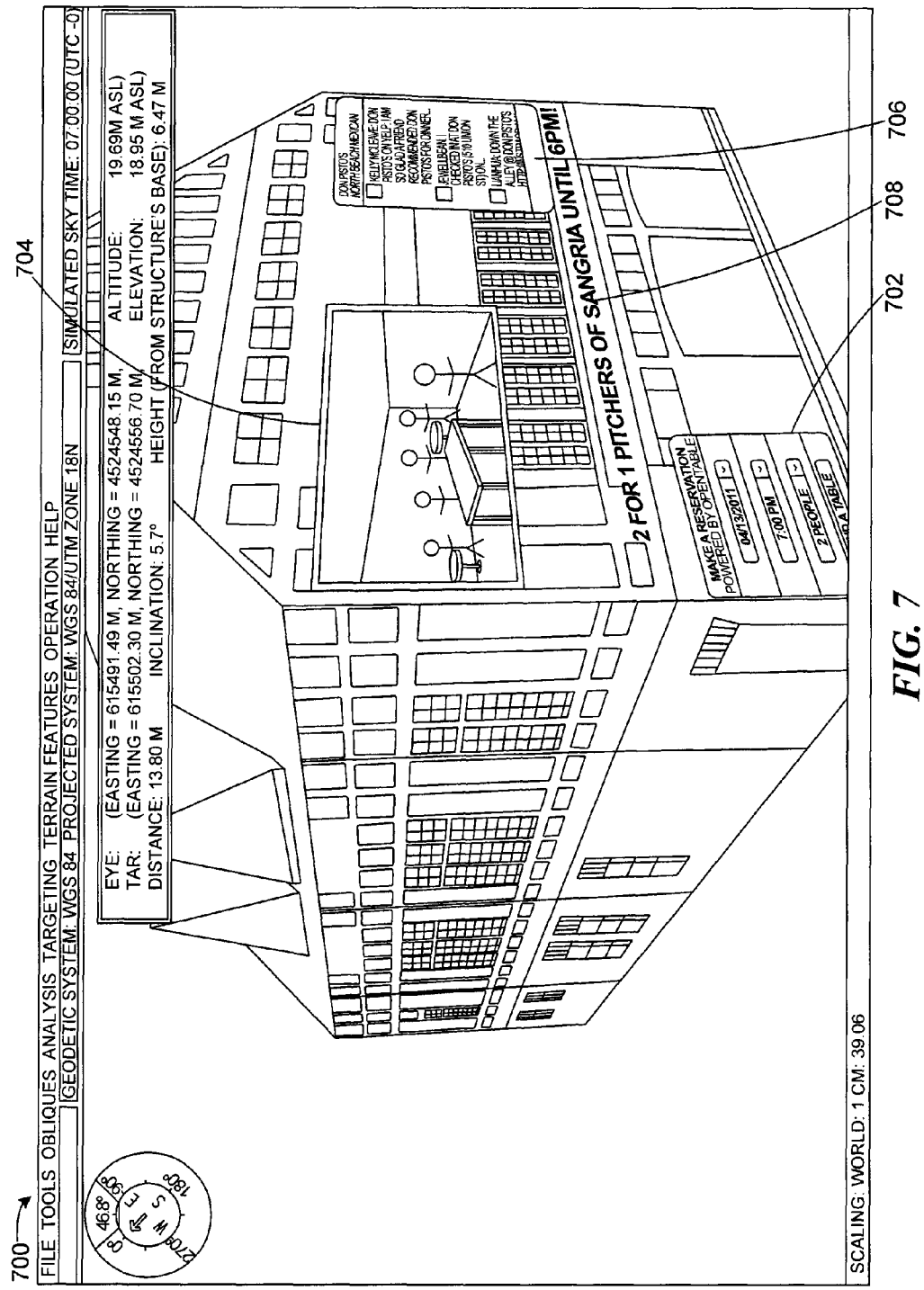
FIG. 7 is an example of an interactive 3D map generated by the 3D map system.

FIG. 7 is an example of an interactive 3D map generated by the 3D map system 100. For example, FIG. 7 can illustrate a screenshot of the building facade that shows a close-up view of a portal 702 through which a building occupant can communicate with map viewers. In the example of the restaurant, the portal 702 can allow a map viewer to make reservations for the restaurant. As shown in the screenshot, the portal 702 is provided by a third party, however, the portal 702 can be directly controlled and/or provided by the building occupant/owner. This portal 702 can be bi-directional where the restaurant, or other business, can post information and/or the user can input information (e.g., a reservation or an order) to the business.

The screenshot shows the representation of buildings on a street where the facade of the building is used to distribute information relating to the building. For example, the information displayed on the facade includes a photograph 704 of an interior room of the building (e.g., a photograph of a restaurant's dining room, potentially coming from a customer or the vendor's own CCTV camera), a social network feed 706 of posts that relate to the building, and a portal for the building occupant (e.g., the restaurant owner) to interact with map viewers, providing advertisement 708 or other useful information, which could be tailored to the user interacting with the three-dimensional facade.

FIG. 7 can include the social network feed 706 on a facade, where the feed 706 is associated with the point-of-interest at the location of the facade. The example screenshot shows a twitter feed associated with the restaurant that is located in the building being viewed. Other examples of social network feeds that can be displayed are review based social sites (e.g., Yelp), location based social networks (e.g., foursquare), etc.

FIG. 7 can include the advertisement 708 that has been uploaded by a restaurant owner. One advantage of generating the three-dimensional map as described above and having an open environment is that map users can add information (e.g., advertisements for an establishment) to the three-dimensional model as shown targeting viewers who is looking at a representation of the establishment.

Figure 8:
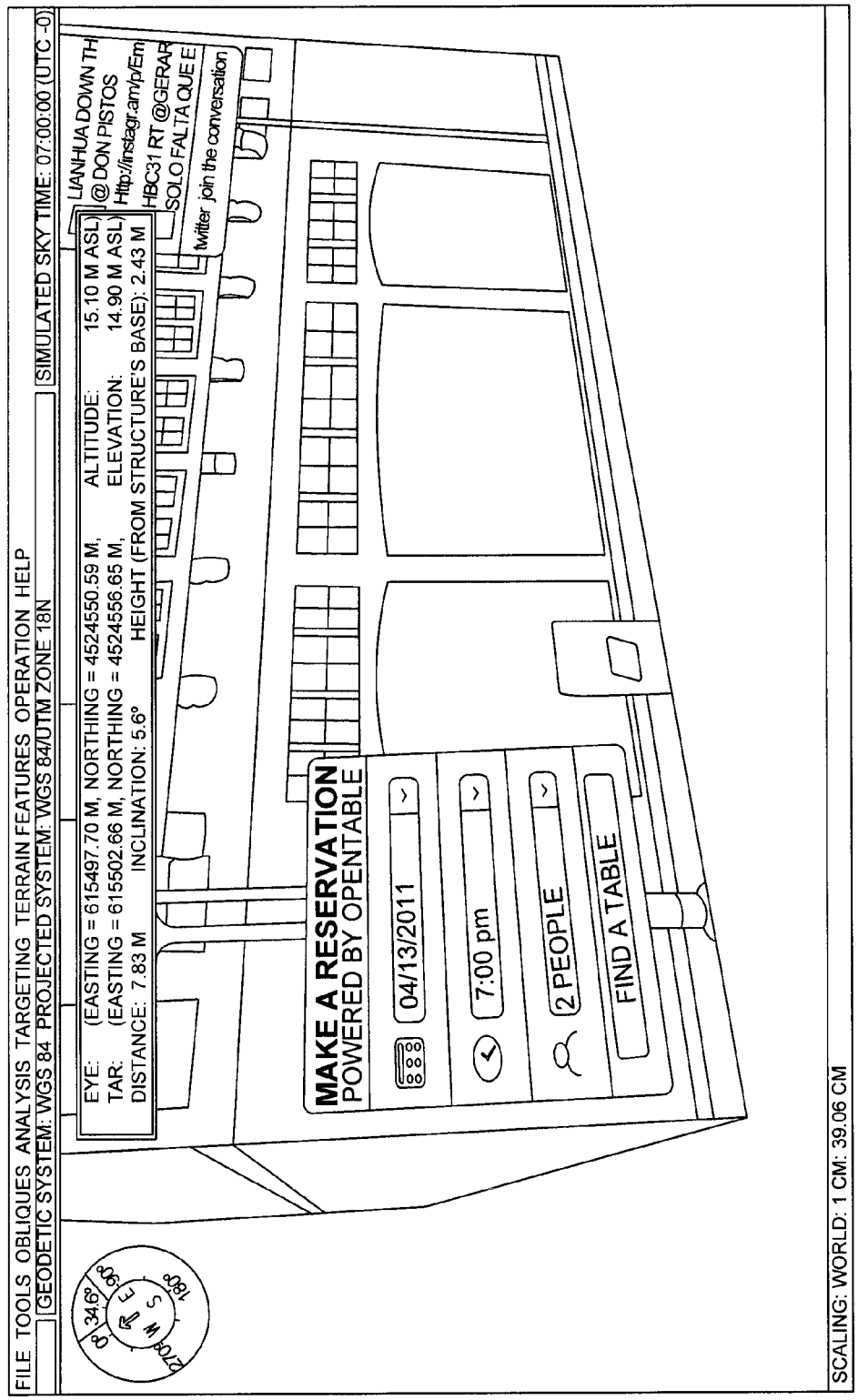
FIG. 8 is another example of an interactive 3D map generated by the 3D map system.

FIG. 8 is another example of an interactive 3D map generated by the 3D map system 100. FIG. 8 illustrates how widgets stay on the facades as if the widgets are part of the wall of the building as viewers traverse through the 3D map world. The widgets can be generated by the widget module 316 of FIG. 3.

Figure 9:
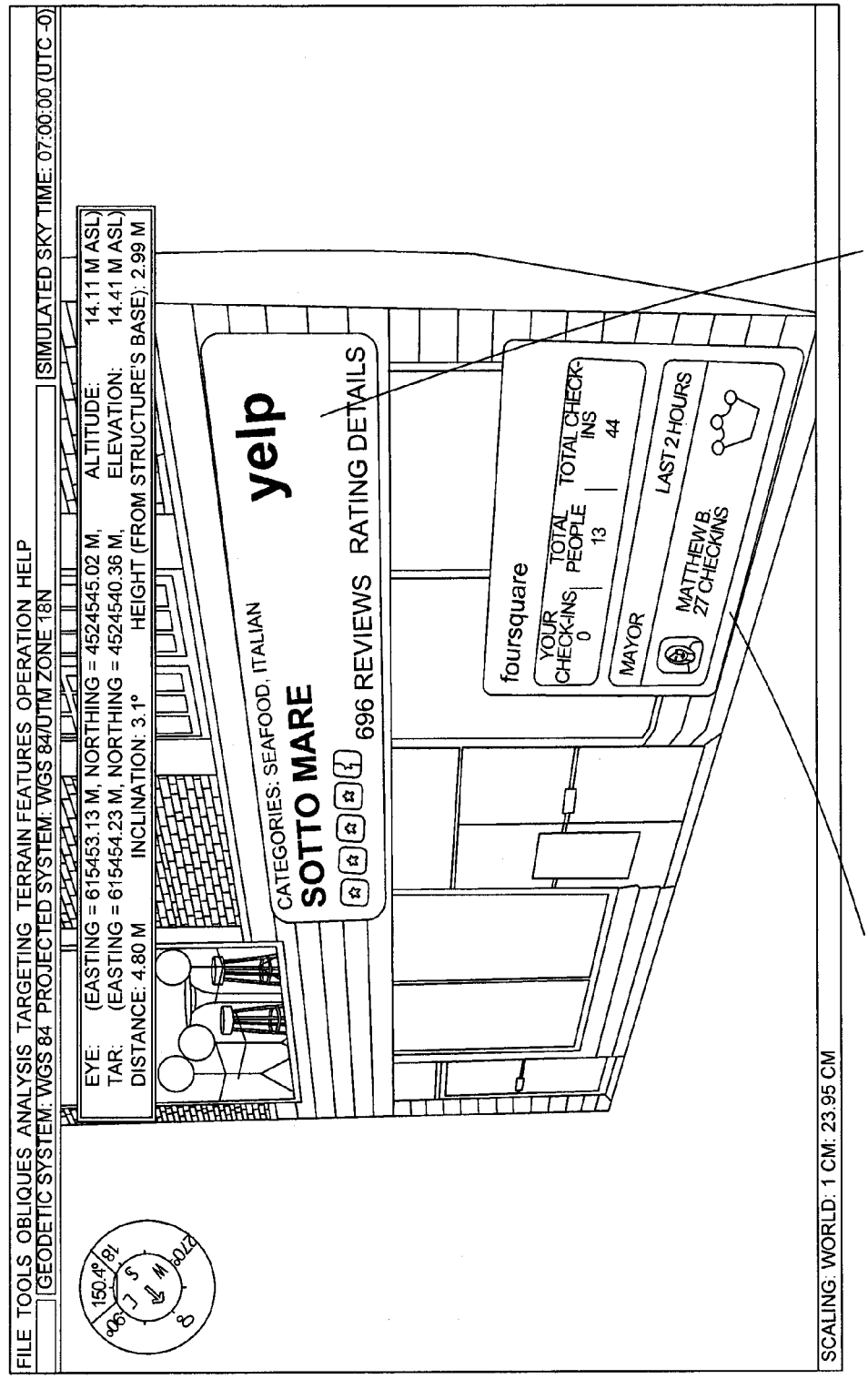
FIG. 9 is yet another example of an interactive 3D map generated by the 3D map system.

FIG. 9 is yet another example of an interactive 3D map generated by the 3D map system 100. FIG. 9 illustrates two examples of review-base website's interfaces to the 3D map. In a first example 902, a Yelp™ review interface is displayed on a facade of a rendered building in the 3D map. In a second example 904, a FourSquare™ review interface is displayed on the same facade of the rendered building.

Figure 10:
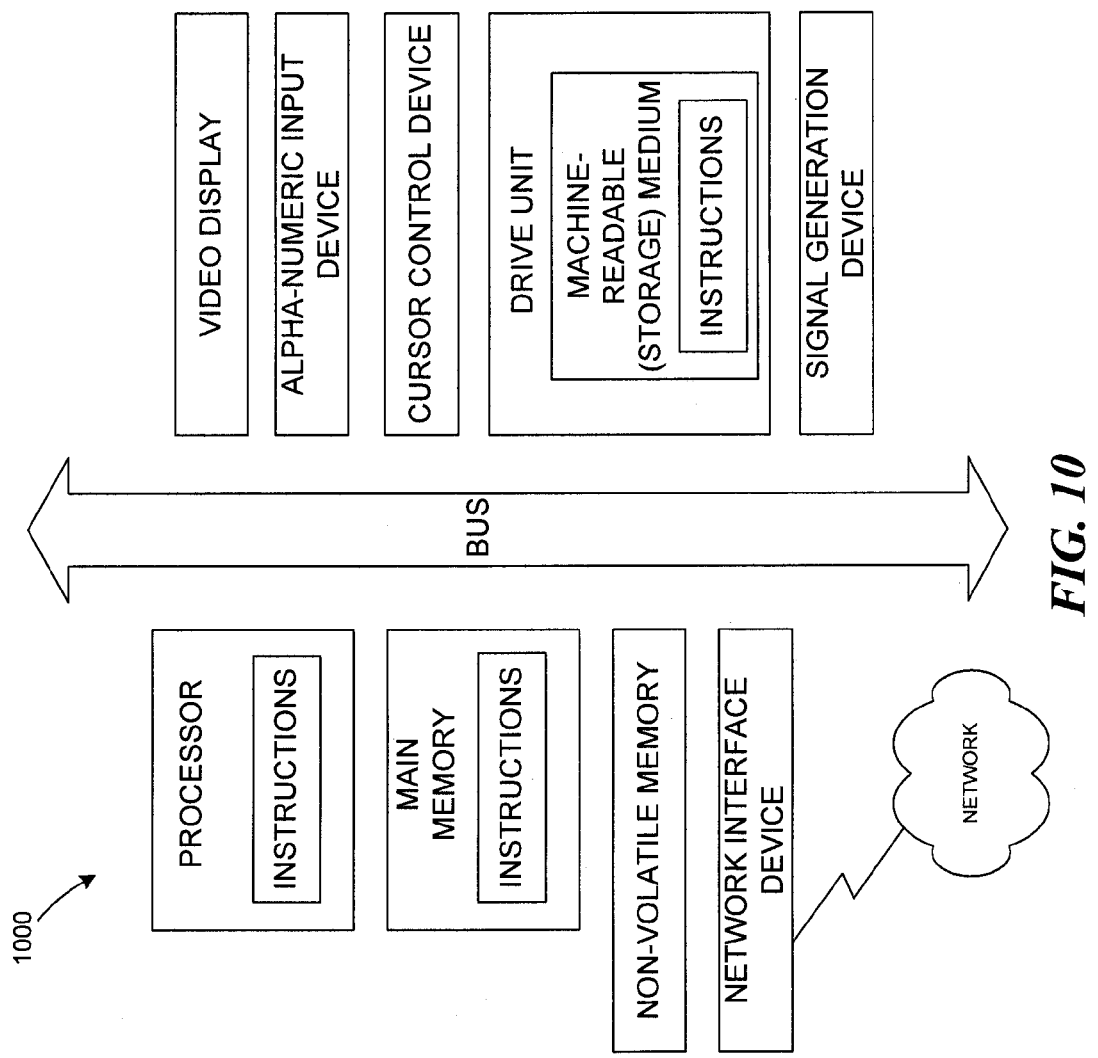
FIG. 10 is a diagrammatic representation of a machine in the example form of a computer system within which a set of instructions, for causing the machine to perform any one or more of the methodologies or modules discussed herein, may be executed.

Referring now to FIG. 10, therein is shown a diagrammatic representation of a machine in the example form of a computer system 1000 within which a set of instructions, for causing the machine to perform any one or more of the methodologies or modules discussed herein, may be executed.

In the example of FIG. 10, the computer system 1000 includes a processor, memory, non-volatile memory, and an interface device. Various common components (e.g., cache memory) are omitted for illustrative simplicity. The computer system 1000 is intended to illustrate a hardware device on which any of the components depicted in the example of FIGS. 1-3 (and any other components described in this specification) can be implemented. The computer system 1000 can be of any applicable known or convenient type. The components of the computer system 1000 can be coupled together via a bus or through some other known or convenient device.

This disclosure contemplates the computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1000 may include one or more computer systems 1000; be unitary or distributed; span multiple locations; span multiple machines; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1000. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 1000. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 10 reside in the interface.

In operation, the computer system 1000 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the invention to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

Those of skill in the art will appreciate that the invention may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative embodiments may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus.

Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method of operating a three-dimensional (3D) map system comprising:
an image mapper system configured for:
receiving an image and a geo-location tag of the image;
determining a building model for a physical building corresponding to an object captured in the image based on the geo-location tag;
mapping, on a region-by-region basis, the image to a stored facade of the building model; and
mapping, on a pixel-by-pixel basis, the image to the stored facade of the building model for displaying the image as a new facade of the building.

2. The method of claim 1, wherein determining the building model includes determining the building model based on color distributions of the image and the stored facade.

3. The method of claim 1, wherein mapping on a pixel-by-pixel basis includes mapping first pixels in a first region of the image to second pixels in a corresponding first region of the stored facade.

4. The method of claim 1, wherein:
receiving the image includes receiving a camera orientation of when the image was taken; and
determining includes determining the building model based on the camera orientation.

5. The method of claim 1, further comprising ranking likelihood of neighboring buildings having been captured in the image.

6. The method of claim 5, wherein ranking the likelihood includes matching color distributions, texture, region-by-region similarity, pixel-by-pixel similarity, or any combination thereof, between the image and the stored facade.

7. A method of operating a three-dimensional (3D) map system comprising:
an image mapper system configured for:
receiving a photograph image and a geo-location tag of the photograph image;
processing the photograph image to remove an obstruction object;
determining a building model for a physical building corresponding to an object in the photograph image based on the geo-location tag;
mapping, on a region-by-region basis, the photograph image to a stored facade of the building model; and
mapping, on a pixel-by-pixel basis, the photograph image to the stored facade of the building model for displaying the photograph image as a new facade of the building model.

8. The method of claim 7, further comprising calculating a certainty probability that a region of the photograph image is mapped to a region of the building model.

9. The method of claim 8, further comprising highlighting the region of the photograph image on an alert display when the certainty probability is below a threshold.

10. The method of claim 9, further comprising:
providing an input box in the alert display to capture a comment regarding mismatch of the highlighted region; and
displaying the highlighted region on a viewer display along with the comment.

11. The method of claim 7, further comprising calculating a certainty probability that a pixel of the photograph image is mapped to a pixel of the building model.

12. The method of claim 7, further comprising calculating a likelihood of the physical building having been captured in the photograph image.

13. The method of claim 7, wherein processing the photograph image to remove the obstruction object includes classifying the obstruction object.

14. The method of claim 7, wherein mapping, on a region-by-region basis, the photograph image includes resizing a region size of the region-by-region basis.

15. A three-dimensional (3D) map system comprising:
a non-transitory storage medium;
a processor;
a collection module for receiving a photograph image and a geo-location tag of the photograph image;
a selection module, coupled to the collection module, for determining a building model for a physical building corresponding to an object captured in the photograph image based on the geo-location tag;
a region match module, coupled to the selection module, for mapping, on a region-by-region basis, the photograph image to a stored facade of the building model;
a pixel match module, coupled to the region match module, for mapping, on a pixel-by-pixel basis, the photograph image to the stored facade of the building model for displaying the photograph image as a new facade of the building; and
wherein the modules are hardware circuitries or stored instructions on the non-transitory storage medium for execution by the processor.

16. The system of claim 15, wherein further comprising a render module for updating the photograph image as the new facade of the building in real-time.

17. The system of claim 15, wherein the pixel match module is for mapping the photograph image irrespective of camera angles of the photograph image and the stored facade.

18. A three-dimensional (3D) map system comprising:
a collection means for receiving a photograph image and a geo-location tag of the photograph image;
a selection means, coupled to the collection means, for determining a building model for a physical building corresponding to an object captured in the photograph image based on the geo-location tag;
a region match means, coupled to the selection means, for mapping, on a region-by-region basis, the photograph image to a stored facade of the building model; and
a pixel match means, coupled to the region match means, for mapping, on a pixel-by-pixel basis, the photograph image to the stored facade of the building model for displaying the photograph image as a new facade of the building.

19. The system of claim 18, further comprising a render means for displaying a 3D map to a viewer station including a rendered display of the building model and the new facade.

20. The system of claim 19, wherein the render means is for highlighting a regional mismatch based on mapping of the region match means.

21. The system of claim 19, wherein the render means is for displaying a social network feed of a tagged user account on the new facade, the tagged user account having been tagged on a geo-location basis.

22. The system of claim 19, wherein the render means is for providing a communication channel linked to a tenant of the physical building through the 3D map.

23. The system of claim 19, wherein the render means is for displaying an advertisement linked to a tenant of the physical building through the 3D map.

24. The system of claim 19, wherein the render means is for providing a measurement utility for measuring physical dimensions of the physical building.

25. The system of claim 19, wherein the render means is for providing an inspection utility for detecting structural changes to the physical building.

\* \* \* \* \*